United States Patent
Craddock et al.

(10) Patent No.: US 10,284,040 B1
(45) Date of Patent: May 7, 2019

(54) BIPOLAR TRANSVERSE FLUX ELECTRIC MOTOR

(71) Applicants: Charles David Craddock, San Paulo (BR); Ingo Gernot Saake, Schwanewede (DE)

(72) Inventors: Charles David Craddock, San Paulo (BR); Ingo Gernot Saake, Schwanewede (DE)

(*) Notice: Subject to any disclaimer, the term of this patent is extended or adjusted under 35 U.S.C. 154(b) by 345 days.

(21) Appl. No.: 15/147,851

(22) Filed: May 5, 2016

(51) Int. Cl.
*H02K 37/00* (2006.01)
*H02K 3/28* (2006.01)
*H02K 1/12* (2006.01)
*H02K 3/02* (2006.01)
*H02K 16/04* (2006.01)
*H02K 19/12* (2006.01)

(52) U.S. Cl.
CPC .................. *H02K 3/28* (2013.01); *H02K 1/12* (2013.01); *H02K 3/02* (2013.01); *H02K 16/04* (2013.01); *H02K 19/12* (2013.01)

(58) Field of Classification Search
CPC .. H02K 3/28; H02K 1/12; H02K 3/02; H02K 16/04; H02K 19/12
USPC ........................................................ 310/49.19
See application file for complete search history.

(56) References Cited

U.S. PATENT DOCUMENTS

2018/0166963 A1* 6/2018 Villaret ................ H02K 41/031

* cited by examiner

*Primary Examiner* — Jianchun Qin
(74) *Attorney, Agent, or Firm* — Gulf Coast Intellectual Property Group

(57) ABSTRACT

A bipolar transverse flux electric motor that is configured to produce a uniform distribution of alternating magnetic fields through utilization of a specific stator and a first coil and a second coil. The bipolar transverse flux electric motor includes a first coil and a second coil wherein the first coil and second coil are positioned in a side by side configuration and wherein the first coil and second coil are have a current flow in opposing directions. The plurality of stators have a shape that includes upper portion and a lower portion with an internal void. The upper portion is greater in width that the lower portion and the lower portion includes two members configured to create a step form. The step form of the lower portion is configured to facilitate the inverse positioning of the stators so as to provide magnetic fields in opposing directions for adjacent stators.

14 Claims, 3 Drawing Sheets

BIPOLAR TRANSVERSE FLUX ELECTRIC MOTOR

PRIORITY UNDER 35 U.S.C SECTION 119(E) & 37 C.F.R. SECTION 1.78

This nonprovisional application claims priority based upon the following prior U.S. Provisional Patent Application entitled: Bipolar Transverse Flux Electric Motor Stator, Application No.: 62/286,543 filed Jan. 25, 2016, in the name of Charles Craddock, which is hereby incorporated by reference for all purposes.

FIELD OF THE INVENTION

The present invention relates generally to electric motors, more specifically but not by way of limitation, a transverse flux electric motor having a specific stator design operable to achieve bipolar characteristics in adjacent nodes.

BACKGROUND

Electric motors are well known in the art and several types of electric motors are commonly available. By way of example but not limitation, one type of electric motor is a transverse flux electric motor. In a conventional transverse flux electric motor, the ferromagnetic material such as but not limited to iron is surroundably or partially surroundably mounted to the electrical conduit, typically copper. Winding heads are not present in this design and as such the copper losses within the motor are reduced to a minimum. The copper and iron cross sections are separated from each other in transverse flux electric motors. This design enables the high number of poles to be achieved without reducing the copper cross-sectional area. This motor design attempts to optimize torque based parameters such as but not limited to the amount of stator teeth or steps executed in the motor. Applications requiring low rotary speeds and high levels of torque are typically favorable applications for transverse flux electric motors.

Conventional transverse flux electric motors are synchronous direct current motors most often with permanent magnets in the rotor. One issue with the conventional transverse flux electric motor design is that it consists of one coil wound in a single direction around the axis on the stator which create a parallel magnetic field in relation to the axis. The amount of poles depend on the number of magnets and not the copper coil as only one copper coil exists.

Accordingly, there is a need for a bipolar transverse flux electric motor having an additional copper coil and further including a specific stator design so as to create a bipolar arrangement between adjacent nodes. The aforementioned construction is operable to create different poles with equal magnetic fields.

SUMMARY OF THE INVENTION

It is the object of the present invention to provide a bipolar transverse electric motor configured to have a first coil and a second coil wherein the first coil is wound in a counter clockwise direction.

Another object of the present invention is to provide a bipolar transverse electric motor configured with a first coil and a second coil wherein the second coil is wound in a clockwise direction.

A further object of the present invention is to provide a bipolar transverse electric motor operable to create a different polarity in adjacent stator poles wherein the stators are comprised to include a first portion and a second portion wherein the second portion is contiguous with the first portion and configured in a step design.

Still another object of the present invention is to provide a bipolar transverse electric motor configured to create a different polarity in adjacent stator poles wherein the stators adjacent to each other are arranged such that the second portion thereof is inversely positioned relative to the adjacent stator so as to create an inverse step design.

An additional object of the present invention is to provide a bipolar transverse electric motor wherein the utilization of a first coil and a second coil in conjunction with the aforementioned stator design creates alternate poles with equivalent magnetic field strengths.

Yet a further object of the present invention is to provide a bipolar transverse electric motor operable create adjacent poles having alternate magnetic fields wherein the first coil is disposed within the second portion of a stator and the second coil is adjacent to the second portion of the same stator.

Another object of the present invention is to provide a bipolar transverse electric motor configured to achieve uniform distribution of alternating magnetic fields amongst adjacent stators.

Still a further object of the present invention is to provide a bipolar transverse electric motor configured to have a first coil, a second coil and a specific stator design that can be utilized in linear, outer runner and inner runner motor designs.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
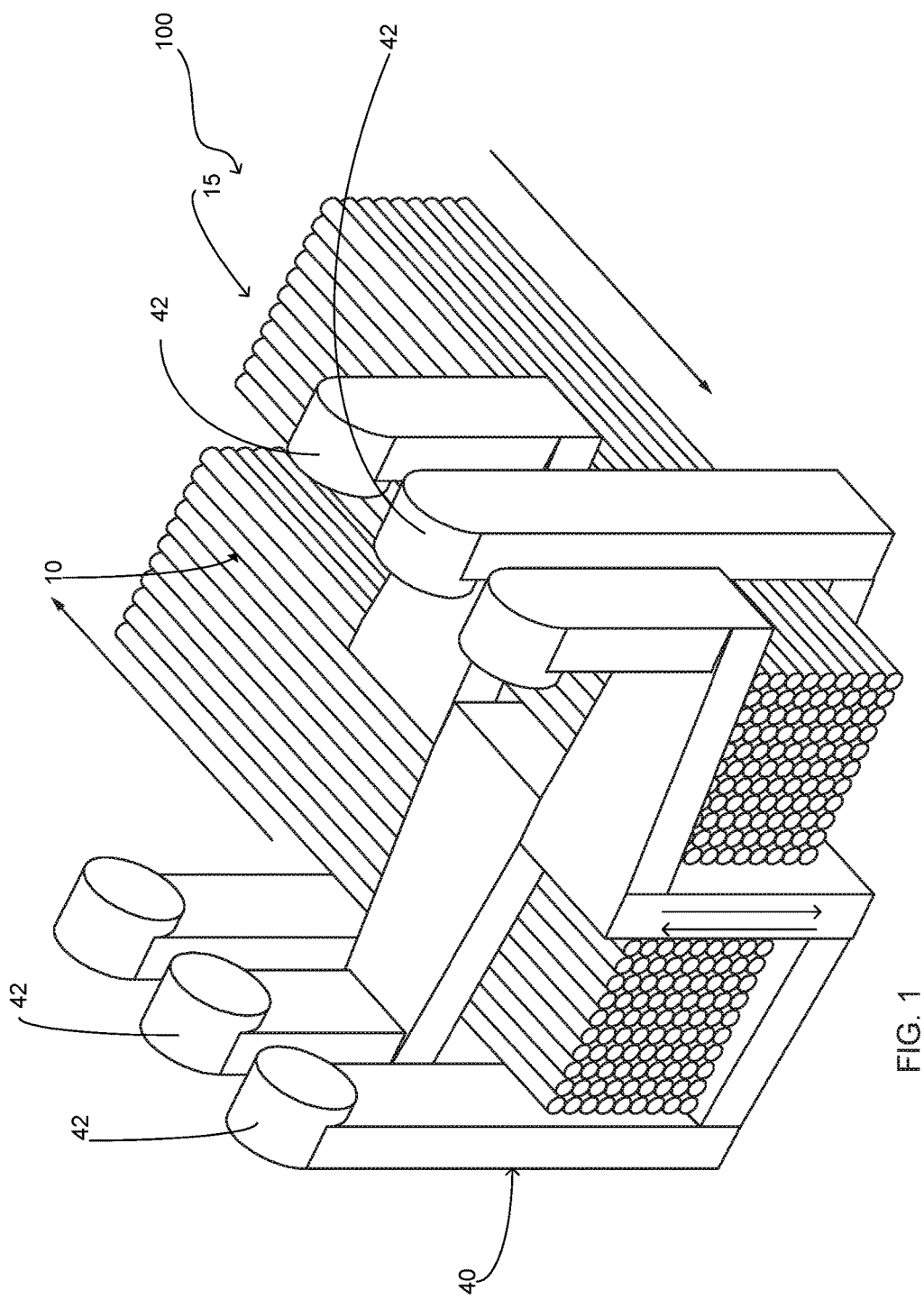
FIG. 1 is a diagrammatic perspective view of the present invention.

Referring now to the drawings submitted herewith, wherein various elements depicted therein are not necessarily drawn to scale and wherein through the views and figures like elements are referenced with identical reference numerals, there is illustrated a bipolar transverse flux electric motor 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 2A:
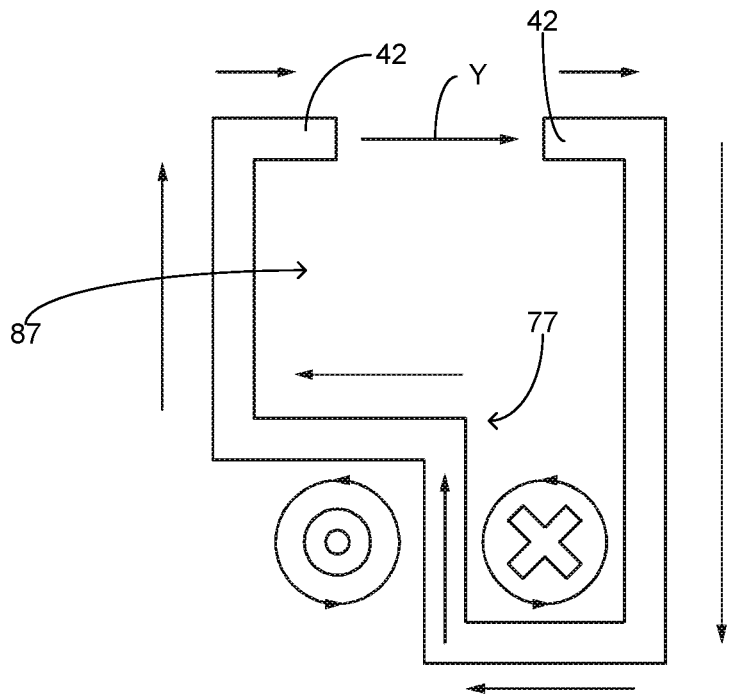
FIG. 2A is a diagrammatic cross-sectional view of an exemplary stator of the present invention in an inverse position from the exemplary stator of FIG. 2.
Figure 2:
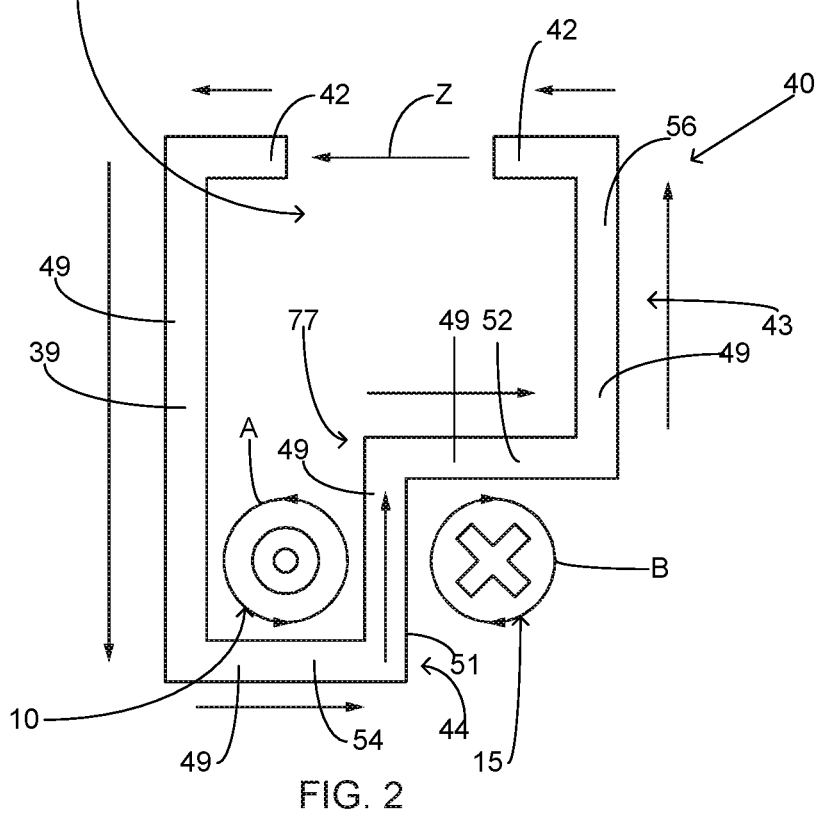
FIG. 2 is a diagrammatic cross-sectional view of the stators of the present invention.

Referring in particular to FIGS. 1 and 2, the bipolar transverse flux electric motor 100 further includes a first coil 10 and a second coil 15. The first coil 10 and second coil 15 are conventional field coils that are manufactured from a conductive material such as but not limited to copper and are configured to have an electrical current transmitted therethrough. The first coil 10 and second coil 15 are constructed identically to each other with the exception of their winding direction or the direction of the electrical current if controlled by a separate controller. The first coil 10 and second coil 15 are respectively wound in an alternate direction. This in combination with the construction of the stators 40, as further discussed herein, creates the different polarities between the stator teeth 42 in adjacent stators 40 as further discussed herein. It should be recognized by those skilled in the art that the first coil 10 and second could 15 could be constructed utilizing various amounts of copper and further be constructed in alternate lengths. It should further be recognized that the first coil 10 and second coil 15 could be wound in various directions so as to create current flow in different direction but wherein the first coil 10 and second coil 15 always have a current direction that is opposite each other.

Figure 3:
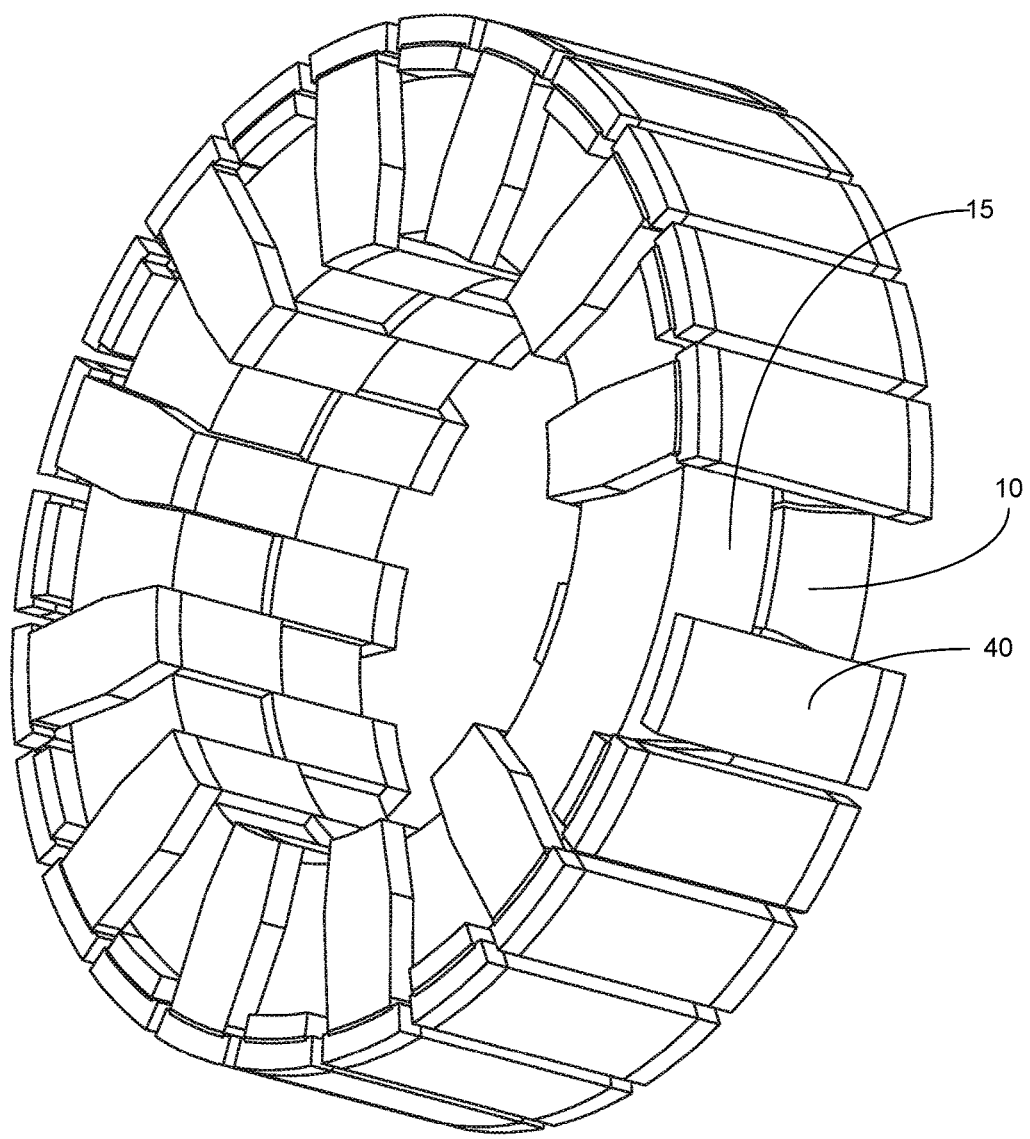
FIG. 3 is a perspective view of the present invention.

The bipolar transverse flux electric motor 100 includes a plurality of stators 40 as particularly illustrated in FIG. 3 herein. A cross-sectional diagram of the stators 40 and the exemplary direction of the magnetic field of alternate stators 40 are illustrated herein in FIG. 2 and FIG. 2A. Referring in particular to FIG. 2, the stator 40 includes a plurality of contiguously formed members 49 that are formed to create a stator 40 having an upper portion 43 and a lower portion 44 and internal void 87. The lower portion 44 is formed so as to have a width that is narrower than that of the upper portion 43. Further, the lower portion 44 contiguously transitions into the upper portion 43 with members 51 and 52, wherein members 51,52 create a step form. Member 51 extends perpendicularly upward from bottom member 54. Member 52 is contiguously formed with member 51 distal to the bottom member 54. Member 52 is perpendicular to member 51 and extends away from member 39, which is opposite thereto. Contiguously formed with member 52 opposite member 51 is member 56. Member 56 is perpendicular with respect to member 52 and extends upward therefrom. Extending inward from member 39 and member 56 and being integrally formed therewith are stator teeth 42. The stator 40 is constructed so as to have either the first coil 10 or the second coil 15 disposed within the lower portion 44 depending upon the orientation of the stator 40. The aforementioned step form of members 51 and 52 create the desired shape so as when the stator 40 is placed in an inverse position (illustrated herein in FIG. 2A) the second coil 15 is disposed within the lower portion 44 of the stator. This alternate orientation and its effects on the magnetic field direction of the stator 40 are further discussed herein. The step form 77 of the lower portion 44 is configured to facilitate the inverse positioning of the stators 40 so as to provide magnetic fields in opposing directions for adjacent stators 40.

First coil 10 is wound in the direction indicated by arrow A. The second coil 15 is wound in the direction indicated by arrow B. It should be recognized that the first coil 10 and second coil 15 could be wound in alternate directions as to that illustrated herein but wherein the first coil 10 and second coil 15 always have current flow in opposite directions. In FIGS. 2 and 2A, the current of the first coil 10 is in a direction toward the viewer and the current of the second coil 15 is in a direction away from the viewer. The aforementioned alternate current directions of the first coil 10 and second coil 15 in conjunction with the structure and form of the stator 40 as described herein create an alternate magnetic field direction for the stator 40 in FIG. 2 versus the stator 40 in FIG. 2A. As indicated by arrow Y in FIG. 2A, the alternate current flow of the first coil 10 and second coil 15 and wherein the second coil 15 is disposed within the lower portion 44 produces a clockwise directional magnetic field between the stator teeth 42. Alternatively, as illustrated in FIG. 2, when the stator 40 is inversely positioned with respect to the position illustrated in FIG. 2A the first coil 10 is disposed within the lower portion 44 of the stator 40. With the stator 40 oriented as shown in FIG. 2, the magnetic field direction intermediate the stator teeth 42 is counter clockwise as indicated by arrow Z. Utilizing the stator 40 form of the present invention and a first coil 10 and a second coil 15, alternate polarities are created between adjacent stator teeth 42 among bordering stators 40 wherein the stators 40 are inversely positioned as illustrated and described herein. This achieves a uniform distribution of alternating magnetic fields amongst adjacent stators 40. It is contemplated within the scope of the present invention that the stator 40 as discussed herein in conjunction with the first coil 10 and second coil 15 could be utilized in linear, outer runner and inner runner motor designs.

While the stators 40 are illustrated herein as being adjacent, it should be recognized that the stators 40 could be configured in alternate configurations wherein a void of various sizes exists intermediate each stator 40.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A single phase transverse flux electric motor configured to create a uniform distribution of alternating magnetic fields amongst adjacent stators comprising:
    a first coil and a second coil, said first coil and said second coil being configured in a side by side manner, said first coil and said second coil being manufactured from a conductive material, said first coil being wound in a first direction, said second coil being wound in a second direction wherein the second direction is opposite of said first direction, said first coil having an electrical current passing therethrough, said second coil having an electrical current passing therethrough, wherein the electrical current passing through said first coil and said second coil flow in opposing directions;
    a group of stators, said group of stators including a plurality of first stators and a second stators, said first stator and said second stator being identically shaped, said first stator and said second stator being placed adjacent to each other wherein said second stator is inverted as compared to said first stator, said first stator and said second stator being identical and inverted for the single phase, said group of stators being operably engaged with said first coil and said second coil, said first stator and said second stator having an internal void, said internal void of said first stator and said second stator configured to receive either said first coil or said second coil therein, said first stator and said second stator each having a structure wherein the structure is formed in a step formation to create a lower portion and an upper portion; and
    wherein the current of the single phase is operable to create two opposing but identical magnetic fluxes.

2. The single phase transverse flux electric motor as recited in claim 1, wherein said first stator and said second stator have a first position wherein in said first position said lower portion is suroundably engaged with said first coil.

3. The single phase transverse flux electric motor as recited in claim 2, wherein said first stator and said second stator have a second position wherein in said second position said lower portion is suroundably engaged with said second coil.

4. The single phase transverse flux electric motor as recited in claim 3, wherein said first stator and said second stator are arranged in the group of stators such that the first stator and second stator are inversely positioned in said first position and said second position wherein the step formation is facing opposing directions.

5. The single phase transverse flux electric motor as recited in claim 4, wherein said first stator and said second stator include stator teeth on opposing sides of the upper portion, said stator teeth having a void therebetween.

6. The single phase transverse flux electric motor as recited in claim 5, wherein each of said first stator and said second stator positioned in said first position have a magnetic field that is counter clockwise in direction.

7. The single phase transverse flux electric motor as recited in claim 6, wherein each of said first stator and said second stator positioned in said second position have a magnetic field that is clockwise in direction.

8. The single phase transverse flux electric motor as recited in claim 7, wherein the group of stators provide a uniform distribution of alternating magnetic fields thus driving optimization of use.

9. A single phase bipolar transverse flux electric motor configured to achieve a uniform distribution of alternating magnetic fields amongst adjacent stators comprising:
    a first coil and a second coil, said first coil and said second coil being configured in a side by side manner, said first coil and said second coil being manufactured from a conductive material, said first coil being wound in a first direction, said second coil being wound in a second direction wherein the second direction is opposite of said first direction, said first coil having an electrical current passing therethrough, said second coil having an electrical current passing therethrough, wherein the electrical current passing through said first coil and said second coil flow in opposing directions;
    a plurality of stators being identical in shape having a step formation as a part thereof, wherein the plurality of stators are arranged in an adjacently patterned inverse manner such that the step formation of each is faced in an opposite direction for the single phase for each adjacent stator, said plurality of stators being operably engaged with said first coil and said second coil, said plurality of stators having a plurality of members forming an upper portion and a lower portion, said upper portion and said lower portion being contiguous, said upper portion being greater in width than said lower portion, said upper portion and said lower portion having an internal void, said internal void of said lower portion configured to receive said first coil or said second coil therein.

10. The A bipolar transverse flux electric motor as recited in claim 9, wherein the plurality of stators include stator teeth on opposing sides of the upper portion, said stator teeth having a void therebetween.

11. The single phase bipolar transverse flux electric motor as recited in claim 10, wherein in a first position said lower portion of said plurality of stators are surroundably mounted around said first coil.

12. The single phase bipolar transverse flux electric motor as recited in claim 11, wherein in a second position said lower portion of said plurality of stators are surroundably mounted around said second coil.

13. The single phase bipolar transverse flux electric motor as recited in claim 12, wherein each of said plurality of stators positioned in said first position have a magnetic field that is counter clockwise in direction.

14. The single phase bipolar transverse flux electric motor as recited in claim 13, wherein each of said plurality of stators positioned in said second position have a magnetic field that is clockwise in direction.

* * * * *